United States Patent
Mandava et al.

(10) Patent No.: US 9,298,492 B2
(45) Date of Patent: Mar. 29, 2016

(54) SYSTEM AND METHOD FOR MODIFYING ALLOCATED RESOURCES

(71) Applicant: CA, Inc., Islandia, NY (US)

(72) Inventors: Srikanth Mandava, Hyderabad (IN); Frank Branciforti, Islandia, NY (US); James Willing, Victoria (AU); Julio Quintana, Baiting Hollow, NY (US); Christine Lyons, Farmingdale, NY (US)

(73) Assignee: CA, Inc., Islandia, NY (US)

( * ) Notice: Subject to any disclaimer, the term of this patent is extended or adjusted under 35 U.S.C. 154(b) by 30 days.

(21) Appl. No.: 14/198,047

(22) Filed: Mar. 5, 2014

(65) Prior Publication Data
US 2015/0254090 A1   Sep. 10, 2015

(51) Int. Cl.
*G06F 9/455*   (2006.01)

(52) U.S. Cl.
CPC ........ *G06F 9/45558* (2013.01); *G06F 9/45533* (2013.01); *G06F 2009/45562* (2013.01); *G06F 2009/45591* (2013.01)

(58) Field of Classification Search
CPC .................................................. G06F 9/45533
USPC ............................................................ 718/1
See application file for complete search history.

(56) References Cited

U.S. PATENT DOCUMENTS

| | | | | |
|---|---|---|---|---|
| 8,321,558 | B1* | 11/2012 | Sirota et al. | 709/224 |
| 9,003,019 | B1* | 4/2015 | Guo | G06Q 10/10 370/352 |
| 2008/0082977 | A1* | 4/2008 | Araujo et al. | 718/1 |
| 2009/0016220 | A1* | 1/2009 | Uysal et al. | 370/232 |
| 2011/0072138 | A1* | 3/2011 | Canturk et al. | 709/226 |
| 2011/0099548 | A1* | 4/2011 | Shen et al. | 718/1 |
| 2014/0007097 | A1* | 1/2014 | Chin et al. | 718/1 |
| 2014/0047440 | A1* | 2/2014 | Da Silva et al. | 718/1 |
| 2014/0082612 | A1* | 3/2014 | Breitgand et al. | 718/1 |

* cited by examiner

*Primary Examiner* — Qing Chen
*Assistant Examiner* — Clint Thatcher
(74) *Attorney, Agent, or Firm* — Gilliam IP PLLC

(57) ABSTRACT

Various embodiments illustrated and described herein include systems, methods, and computer program products to modify virtual machine resources. Some embodiments collect a wide variety of metrics and then analyze the metrics to determine whether a virtual machine is not being utilized. This determination may include an associated confidence level. When the confidence level reaches a designated threshold, action may be initiated. Such actions can include notifying users of the virtual machine and/or a user's supervisor that the virtual machine is not being utilized and that further action will be taken at a designated time. Further actions can include such things as archiving the virtual machine, reducing the resources allocated to the virtual machine, archiving user data, and deleting the virtual machine.

19 Claims, 8 Drawing Sheets

SYSTEM AND METHOD FOR MODIFYING ALLOCATED RESOURCES

BACKGROUND

The disclosure relates generally to monitoring resources allocated to users such as virtual machines or computing resources, and more particularly, to monitoring when virtual machine or computing resources are not being used and to taking action when the need for virtual machine or computing resources has changed.

BRIEF SUMMARY

According to one aspect of the present disclosure data representing one or more metrics are collected. The metrics relate to utilization of a virtual machine or other computing resources. The metrics are analyzed in accordance with a decision criteria to determine whether a virtual machine or other computing resources are not being utilized. The results of the analysis may include a confidence factor. A policy may include actions to be taken when individual metrics, combinations of metrics and/or the confidence factor reaches certain thresholds. Actions can include, for example, notifications sent or modifications made to the virtual machine or other computing resources. Actions in accordance with the policy and confidence factor can be initiated.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
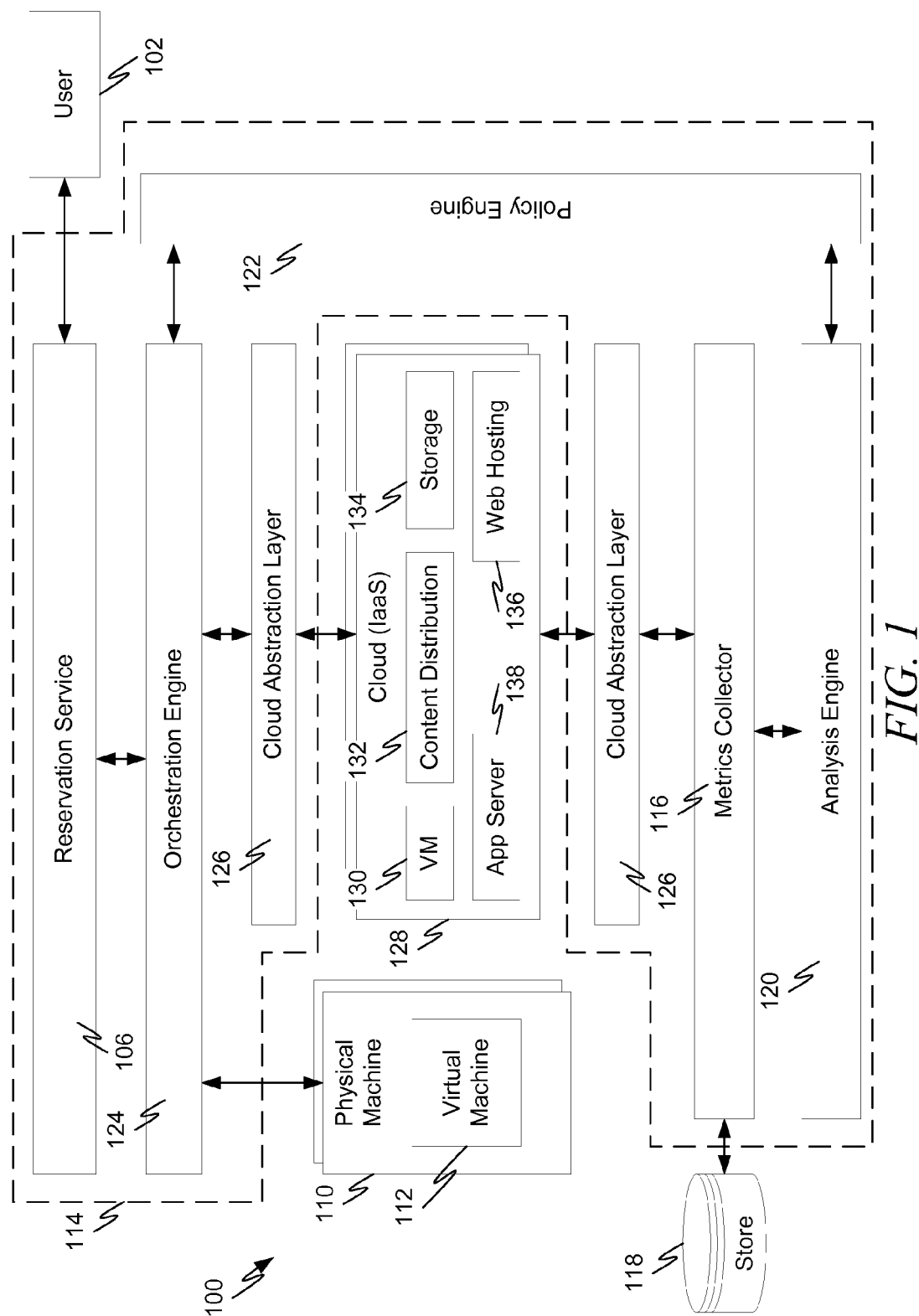
FIG. 1 illustrates an example system to modify computing resources.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. However, computer readable storage medium does not include computer readable signal medium.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Systems exist that allow a user to provision a virtual machine for a period of time in order to accomplish various tasks. The idea behind such a system is that a user can reserve a virtual machine for a needed period of time and after the period of time elapses (e.g., the need for the virtual machine expires), the resources can be reclaimed and reallocated to other purposes. One issue with this type of system is that users often perceive the resources needed for the virtual machine as free and/or unlimited and may keep virtual machines provisioned "just in case" they are needed at a later date. This makes it difficult to identify and recover resources that are no longer being used.

FIG. 1 illustrates an example system 100 to modify computing resources. The system may include a mechanism to allow users to provision computing resources. For example, a user 102 may interact with a reservation service 106 in order to identify needed resources and to provision a virtual machine or other computing resource. The reservation service 106 ensures the user is authorized to utilize the resources and may gather such information as the resources that are needed, how long the system should be provisioned, why the system needs to be provisioned (e.g., the purpose), and any other additional information necessary to provision the system. The system may also gather information like cost recovery information (e.g., account billing information) if it is utilized, user account information, etc.

Reservation service 106 may collect information from user 102 necessary to initiate the provisioning process. Reservation service 106 may also perform user authentication and/or authorization as well as data verification and/or validation. As part of these functions, reservation service 106 may perform such functions as ensuring user 102 is authorized to make the request, identify whether the request is in compliance with policy, identify whether the appropriate resources are available, etc.

Reservation service 106 may also interact with other systems, engines, and/or services to accomplish the actual provisioning. In FIG. 1, reservation service 106 utilizes orchestration engine 124 to accomplish the actual provisioning. In the example of FIG. 1, orchestration engine 124 is responsible for ensuring completion of the provisioning process. Orchestration engine 124 may interact with further systems, engines and/or services to accomplish this task. Although not shown explicitly in FIG. 1, Reservation service 106 and/or orchestration engine 124 may provide feedback and/or notification to user 102 as to the status and/or completion of the provisioning process.

FIG. 1 illustrates various resources that may be provisioned, such as physical machines 110, virtual machines 112, cloud or Infrastructure as a Service (IaaS) resources, etc. As used in this disclosure, the term "resources" means computing resources that can be requested, provisioned, and allocated to a user, group of users or other entity. Cloud and IaaS will be used interchangeably herein. Examples of cloud resources may include, but are not limited to, virtual machines 130, content distribution systems/resources 132, storage systems/space 134, application servers 138, web hosting 136, etc. Cloud resources may be provided by various systems and/or companies and include such examples as Amazon AWS, Rackspace, VMWare, etc. Cloud resources may be remote or "public" (such as provided by a service provider) or may be provided by a so-called "private" cloud or a combination of both. When provisioning resources users may also specify such parameters as storage space, network connectivity, computing power, etc.

Not specifically illustrated in FIG. 1 are higher-level resources such Platform as a Service (PaaS) or Software as a Service (SaaS). The former may include, but is not limited to, such things such as database resources, database management resources, testing tools, developer tools, directory services, etc. The latter may include, but is not limited to, such things as wiki/blogs, social networking, collaboration and participatory tools, email, instant messaging, virtual desktops, office automation, productivity applications, core or line of business applications, etc. While these are not specifically illustrated, such higher-level software, tools, services, etc. may certainly be part of the requested, provisioned, allocated, and monitored resources.

In the embodiment of FIG. 1, cloud resources are reached through cloud abstraction layer 126. Cloud abstraction layer 126 represents an abstraction of the cloud systems below it. In this way, the monitoring and adjustment system 114 may be independent of the particular type of cloud system/resources used. Cloud abstraction layer 126 provides an interface to interact with any cloud and may also provide an interface that allows multiple clouds to appear as a single cloud. Although cloud abstraction layer 126 is shown as part of monitoring and adjustment system 114, the actual layer may be split between monitoring and adjustment system 114 and the clouds 128 or may be implemented by the clouds 128.

Resources should be provisioned for as long as needed, but should be recovered as soon as they are not needed. However, users are often not a good source of information when determining whether a user still needs a provisioned resource. However, various metrics may identify whether a resource is still being utilized.

Monitoring and adjustment system 114 represent an example of how metrics may be collected and analyzed and decisions made as to what should happen to provisioned resources. Monitoring and adjustment system 114 may comprise a mechanism to identify and collect metrics that relate to resource utilization. Such metrics may be collected from the resources, such as virtual machines 112, physical machine 110, cloud 128, or from a related environment such as a host operating system, network, etc. (not shown) and/or from some combination thereof. In FIG. 1, metrics collector 116 represents the mechanism that identifies and collects metrics related to resource utilization.

Metrics collector 116 may collect data (or data values) for the various metrics so that trends may be monitored over time.

This may be important when attempting to identify resources that are no longer needed as not all resources are used on a continual basis. Thus, the various metrics may indicate patterns over time that will indicate either continued use or that the resource is likely unused. Also, as used herein, "data" and/or "data values" may include the absence of a value or metric. For example, if a user does not log onto a system (e.g., the absence of an entry indicating a user logged onto the system), a data value associated with that event may be either expressly stored (e.g., "no logon") or may be inferred from the absence of an entry indicating a logon event. Both are encompassed within the terms "data," "data value," "collected data," or "collected data value" as used herein.

As data is collected, it may be stored for later analysis. Data store 118 represents such a storage location. Data store 118 is not specifically illustrated as part of monitoring and adjustment system 114, although it may be. Furthermore, data store 118 may represent both storage that is part of the system and storage that is outside the system. Note that data store 118 may be local or remote, permanent or temporary. Similarly, data stored on data store 118 may be kept until no longer needed and then either archived or deleted. All that is required is to match the characteristics of data store 118 and the data stored thereon to the desire analysis frequency. In determining how long to keep data, consideration should be given as to how much (or how long) data is needed to determine usage or non-usage from a given metric. In other words, the system will generally keep sufficient data to identify the desired patterns in the metrics. Also note that the system need not keep all gathered data for the same amount of time. For example, one metric that may display patterns of usage (or non-usage) in a shorter period of time may be kept for less time than another metric that may display patters of usage (or non-usage) in a longer period of time.

Analysis engine 120 retrieves data stored on data store 118 and analyzes it to determine whether a resource is utilized or not utilized. FIG. 1 illustrates this data being obtained from metrics collector 116. Alternatively, or additionally, the data may be retrieved directly from data store 118 (or indirectly from some other entity/system). In performing this analysis, analysis engine 120 may make a decision (e.g., use or non-use) and/or associate that decision with a confidence level (sometimes referred to as a confidence factor). The confidence level may be interpreted as how likely it is that a given determination is correct (e.g., the virtual machine is utilized or not utilized).

The analysis performed by analysis engine 120 is discussed in greater detail below. However, in general, the metrics may be examined individually or collectively for patterns that indicate use or non-use of a virtual machine. In making this examination, the analysis engine 120 may use decision criteria to indicate what metric value or combination of metric values yields a particular decision, perhaps with an associated confidence level. These decision criteria may also indicate patterns that should be used to identify a decision and/or confidence level. Criteria may be based on combined metrics and/or individual metrics. The methods used by analysis engine 120 may be "pluggable" so that new methods may be added, old methods may be removed, and/or methods may be modified without altering analysis engine 120.

Once analysis engine 120 has determined a decision and/or confidence level associated with non-use of a particular resource (or set of resources), policy engine 122 may evaluate policies to identify what action or actions to take. Policies may map confidence level to particular actions to take. For example, if the system is measuring whether or not a virtual machine is used, for a non-use decision with a confidence level of 50%, the policy may indicate that notification should be sent to the user of a virtual machine to notify the user that the system is beginning to believe that the virtual machine is unused. As the confidence level increases, additional actions may be taken, such as notifying the users supervisor. Policies may also account for prior actions taken. For example, if notification was sent to a user last time, perhaps this time notification should be sent to both the user and the user's supervisor. Policies may also map individual metrics to particular actions, such as when a user has not logged into a virtual machine for one month, notification is sent to the user and to the user's supervisor. Policies may also map combination of metrics to particular actions, such as when a user has not logged into a virtual machine for one month and the disk usage of the virtual machine has not changed in two months, then the virtual machine is placed on "hold" for a designated period of time. Finally a policy may contain some combination of the described options.

Although virtually any actions can be taken, the available actions tend to break down into various categories. One category is notification, where some individual/entity or combination of individuals/entities are notified of such things as a determination by the system that a resource is unused, a particular action that should be taken (e.g., notify the IT department that the resource is still needed), a deadline by which a particular action should be taken (two weeks), a further action that will be taken (e.g., the resource will be reclaimed and any information associated therewith archived) or some combination thereof.

Another category is modification of the resource. This category includes modification of the allocated resource. This may include such actions as marking a virtual machine for deletion at a particular deadline, archiving user data, reducing or expanding the resources allocated to user, deleting or archiving the allocated resources, etc.

Yet another category is to kick off a workflow where a sequence of additional actions will be taken. One example could be that the system kicks off a workflow to require the user to provide additional approvals in order to keep the cloud computing resources online. Another example is that the system kicks off a workflow to gain approval for an increase in resources allocated to the user, such as memory, storage space, time extension, etc. This category (e.g., kicking off a workflow) can include any sequence of steps or sequence of additional actions that should be taken, possibly coupled with logic, such as business logic.

Action initiation may include interacting with further systems, engines, and/or services to accomplish the actions. For example, policy engine 122 may use orchestration engine 124 to use an email system or phone system to perform notifications, or utilize a workflow engine to kick off a workflow, etc.

Figure 2:
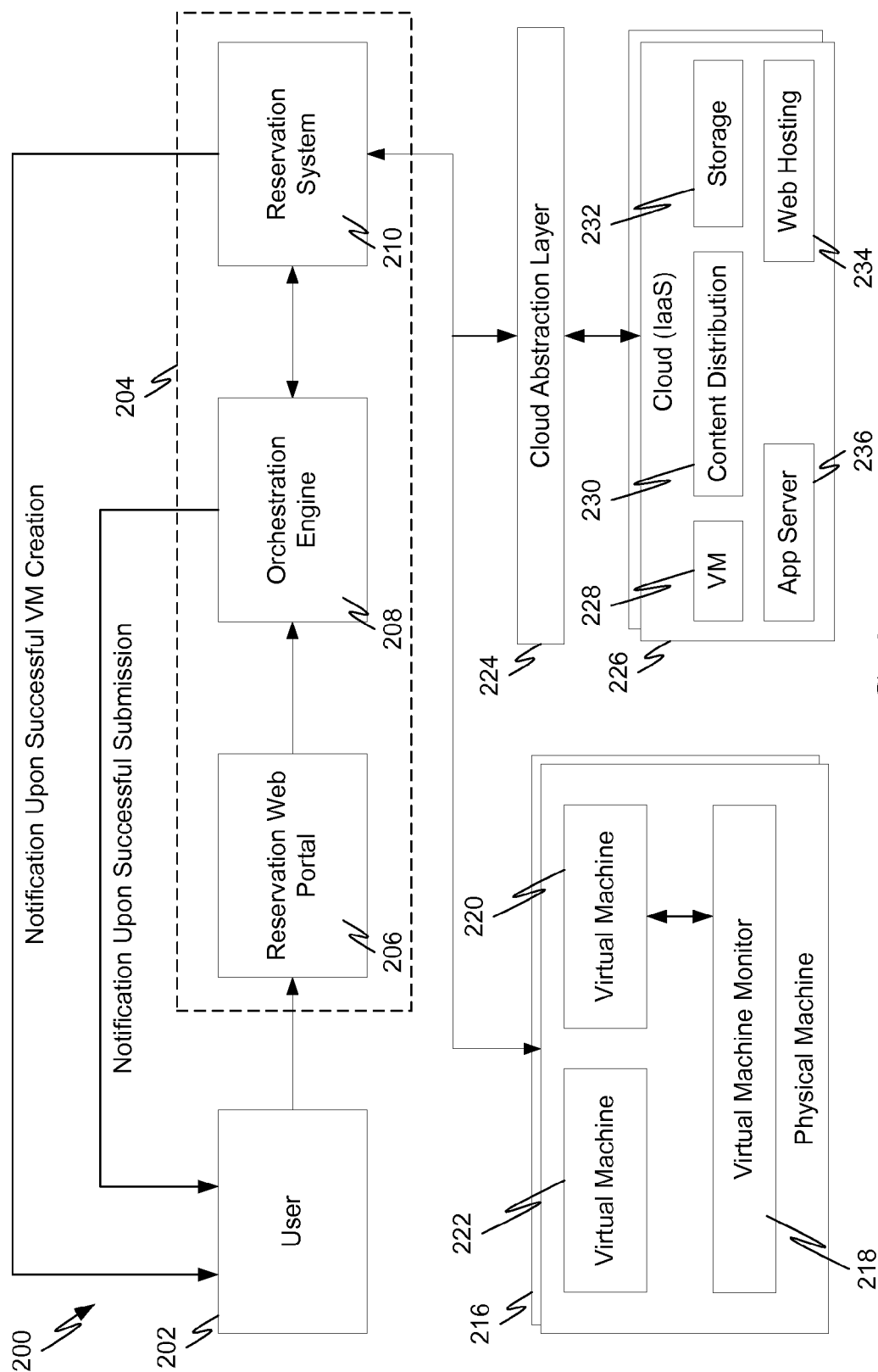
FIG. 2 illustrates an example system to provision computing resources.

FIG. 2 illustrates an example system 200 to provision a virtual machine. This figure represents, for example, an alternative to the provisioning process described in conjunction with FIG. 1. In the example of FIG. 2, user 202 uses reservation and provisioning system 204 to reserve and provision an appropriate virtual machine. Reservation and provisioning system 204 represents an example reservation and provisioning system. Reservation and provisioning system 204 ensures user 202 is authorized to utilize the resources and may gather such information as the resources that are needed, how long they should be provisioned, why they need to be provisioned (e.g., the purpose), and any other additional information necessary to provision the desired resources. Reservation and provisioning system 204 may also gather information like cost recovery information (e.g., account billing information) if it is utilized, user account information, etc. Reservation and provisioning system 204 may use a mechanism such as reservation web portal 206 to interact with user 202, collect the required information. Reservation web portal 206 may also perform user authentication and/or authorization as well as data verification and/or validation, to the extent these functions are not performed elsewhere. Reservation web portal 206 may also ensure user 202 is authorized to make the request, identify whether the request is in compliance with policy, identify whether the appropriate resources are available, etc., although in the particular embodiment illustrated in FIG. 2, these functions are performed by orchestration engine 208, as discussed below. Orchestration engine 208 may be an example of the orchestration engine 124 illustrated in FIG. 1.

Once the appropriate information has been collected from user 202, the information can be passed to orchestration engine 208. In the illustrated example, orchestration engine 208 performs functions such as data verification and/or validation and coordination and orchestration of various systems, engines, and/or services to make the submission. Orchestration engine 208 may also ensure user 202 is authorized to make the request, identify whether the request is in compliance with policy, identify whether the appropriate resources are available, etc. Alternatively, other systems, engines, and/or services, including reservation web portal 206 and/or reservation system 210, may perform some or all of these functions. Reservation system 210 may be an example of reservation service 106 of FIG. 1.

Upon successful submission, orchestration engine 208 may notify user 202 as indicated in FIG. 2. Such notification may be made, for example, using an email system (not shown), messaging (not shown), a phone system (not shown), etc.

Reservation system 210 takes information submitted by user 202 as well as any other required information and coordinates with other systems, engines and/or services to actually provision the virtual machine with the appropriate resources. An example of such a reservation system is the reservation manager component of the CA Server Automation provided by CA Technologies. In FIG. 2, reservation system 210 may coordinate with the appropriate systems, etc. to accomplish the actual provisioning. Such systems may include, but are not limited to, physical machines, cloud computing systems, etc. FIG. 2 illustrates physical machines 216 and clouds 226.

Physical machines 216 may include various virtual machines 220, 222 and virtual machine monitor 218. Virtual machine monitor 218 represents the layer of the virtual machine that is able to actually create and provision a virtual machine. The exact name of the virtual machine monitor will depend on the virtual environment being used. Hypervisor (or HyperV) provided by Microsoft is one example of virtual machine monitor 218. Thus, virtual machine monitor 218 may create and provision virtual machines 220 and 222. Assuming, for example, that reservation system 210 used virtual machine monitor 218 to provision virtual machine 220, once virtual machine 220 is successfully created, reservation system 210 may send notification to user 202 as indicated in FIG. 2.

Cloud resources may be provisioned through cloud abstraction layer 224. As discussed in conjunction with FIG. 1, cloud abstraction layer 224 represents an abstraction of the cloud systems below it (e.g. 226). Cloud abstraction layer 224 provides an interface to interact with any cloud and may also provide an interface that allows multiple clouds to appear as a single cloud. Through cloud abstraction layer 224, various cloud resources may be provisioned, such as virtual machines 228, content distribution systems/resources 230, storage systems/space 232, application servers 236, web hosting 234, etc. Once the resources are provisioned, reservation system may be notified through abstraction layer 224 and the user may be notified of successful provisioning as illustrated in FIG. 2.

Figure 3:
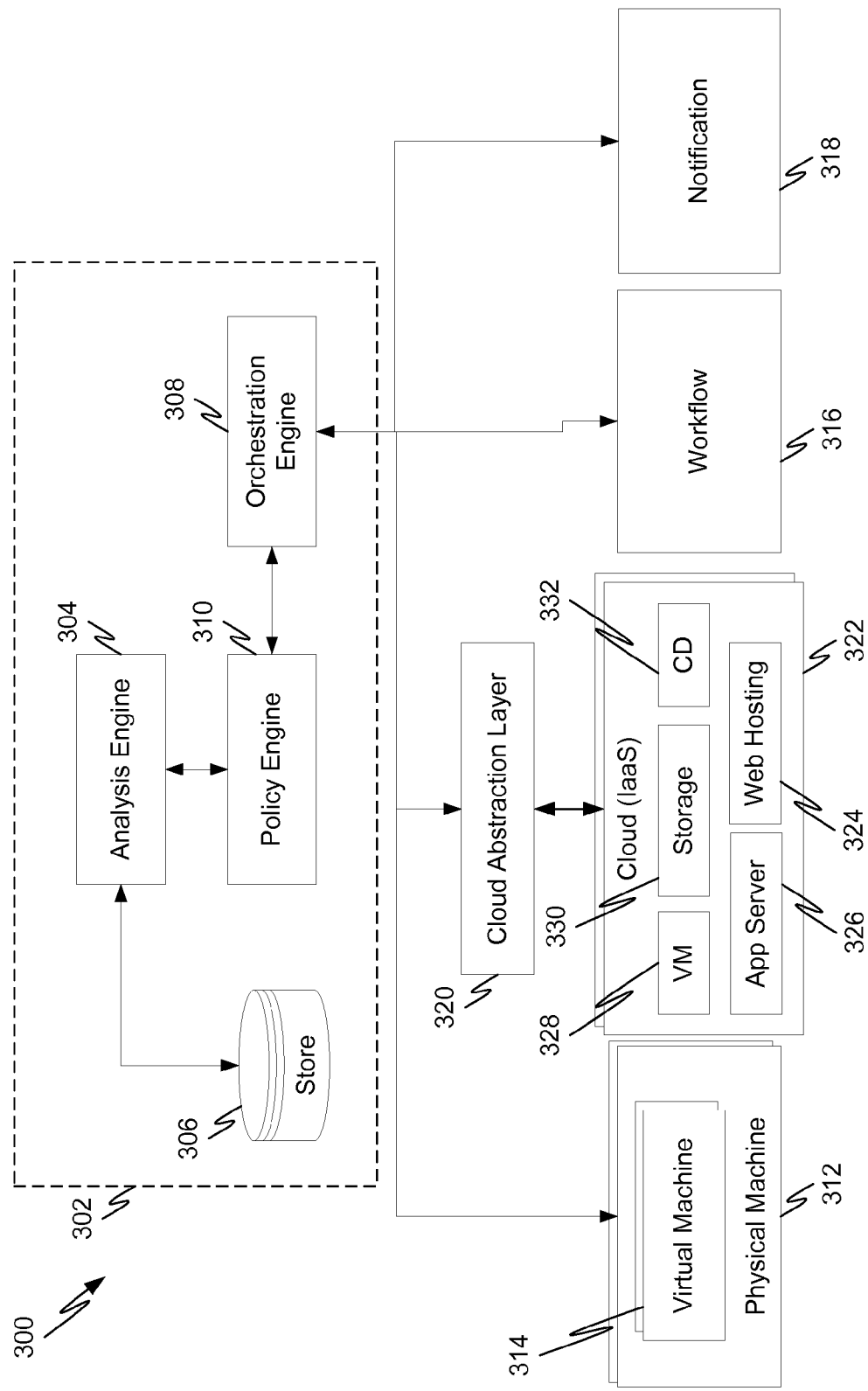
FIG. 3 illustrates an example system illustrating actions to be performed based on computing resource utilization.

FIG. 3 illustrates an example system 300 illustrating actions to be performed based on resource utilization. System 300 comprises monitoring and adjustment system 302. Although not specifically shown in FIG. 3, monitoring and adjustment system 302 may comprise mechanisms to collect data on various metrics and store collected data in data store 306, such as those illustrated and discussed in conjunction with FIG. 1, FIG. 4, FIG. 5 and FIG. 6.

Analysis engine 304 may retrieve data stored on data store 306 and analyzes it to determine whether a resource is utilized or not utilized. As previously described, this analysis may be based on analyzing either individual metric data, and/or metric data in the aggregate (e.g., combinations of metric data). Furthermore, the metric data may be compared to decision criteria to indicate what metric value or combination of metric values yields a particular decision (e.g., a virtual machine is used or not used). Analysis engine 304 may simply produce a result (e.g., the resource is used or not used) or may couple that result with a confidence level (sometimes referred to as a confidence factor). The confidence level may be interpreted as how likely it is that a given determination is correct (e.g., the likelihood that a resource is utilized or not utilized). The decision criteria may also indicate patterns within the data that should be used to identify a confidence level.

The analysis performed by analysis engine 304 is discussed in greater detail below. However, in general, analysis engine 304 may examine the metric data individually and/or collectively and compare the metric data to thresholds and/or value ranges (e.g., specified in the decision criteria) to make a determination whether a virtual machine is used or not used. Analysis engine 304 may also examine metric data for patterns that indicate use or non-use of a virtual machine. Any or all of the criteria, metric data, metric data combinations, patterns, etc. may be specified in decision criteria. Decision criteria may also map these types of parameters not only to a decision, but also to a confidence level associated with that decision.

Once analysis engine 304 makes a determination, possibly with an associated confidence level, regarding use or non-use of a particular virtual machine (or set of virtual machines), policy engine 310 utilizes policies to determine what action or set of actions to take. Policies may map decisions and/or confidence level to particular actions to take. For example, for a non-use decision with a confidence level of 50%, the policy may indicate that notification should be sent to the user of the resource to notify the user that the system is beginning to believe that the resource is unused. As the confidence level increases, additional actions may be taken, such as notifying the user's supervisor. Policies may also account for prior actions taken. For example, if notification was sent to a user last time, perhaps this time notification should be sent to both the user and the user's supervisor. Policies may also map individual metrics to particular actions, such as when a user has not logged into a resource for one month, notification is sent to the user and to the user's supervisor. Policies may also map combination of metrics to particular actions, such as when a user has not logged into a virtual machine for one month and the disk usage of the virtual machine has not changed in two months, then the virtual machine is placed on "hold" for a designated period of time. Finally a policy may contain some combination of the described options.

Once the policy engine 310 determines the action or set of actions to take, the policy engine may use an orchestration engine 308 to perform the action or set of actions. Although virtually any actions can be taken, the available actions tend to break down into various categories. These categories and the systems that may be utilized to effectuate the actions are illustrated in FIG. 3. One category is notification, where some individual, entity or combination of individual(s) and/or entitie(s) are notified of such things as a determination by the system that a virtual machine is unused, a particular action that should be taken (e.g., notify the IT department that the virtual machine is still needed), a deadline by which a particular action should be taken (two weeks), a further action that will be taken (e.g., the virtual machine will be archived) or some combination thereof. In FIG. 3, this category may utilize various notification systems, illustrated by notification system 318. Notification systems may include such systems as an email system, texting/paging, phone calls, chat/instant messaging, or any other desired notification system for a particular user and set of circumstances.

Another category is modification of the resource. This may include such actions as marking a resource for deletion at a particular deadline, archiving user data, reducing or expanding the resources allocated, deleting or archiving the resource, etc. Physical machine 312, virtual machines 314, and/or cloud 322 (with its resources) illustrate this option in FIG. 3.

In making modifications to the resource(s), the system will use mechanisms appropriate to the particular environment. Sometimes this means that orchestration engine 308 may interface directly with the affected resource. Sometimes this may mean that orchestration engine 308 interfaces with the host operating system (not shown) on the physical machine or with components hosting the virtual machine (such as a virtual machine monitor, not shown). Sometimes this may mean that orchestration engine 308 may interact with other external components. Various embodiments are possible, depending on the exact embodiment implementation.

In FIG. 3, orchestration engine 308 may directly access physical machine 312. Orchestration engine 308 accesses cloud 322 and its resources through cloud abstraction layer 320. As previously discussed, cloud abstraction layer 320 provides an interface to interact with any cloud and may also provide an interface that allows multiple clouds to appear as a single cloud. Through cloud abstraction layer 320, various cloud resources may be provisioned, reclaimed or otherwise accessed and/or modified. Such resources include, but are not limited to, virtual machines 328, content distribution systems/resources 332, storage systems/space 330, application servers 326, web hosting 324, etc.

Yet another category is to kick off a workflow where a sequence of additional actions will be taken. One example could be that the system kicks off a workflow to require the user to provide additional approvals in order to keep the virtual machine online. Another example is that the system kicks off a workflow to gain approval for an increase in resources allocated to the virtual machine, such as memory, storage space, time extension, etc. This category (e.g., kicking off a workflow) can include any sequence of steps or sequence of additional actions that should be taken, possibly coupled with logic, such as business logic. This option is illustrated in FIG. 3 as workflow system 316. Workflow system 316 represents any system or combination of systems that are used in the workflow option. One example of such a workflow may be that a process sends a request to a user to get approval for the deletion of a no-longer used resource. Upon receiving approval, the process (or a different process) can log a ticket indicating all details for future reference/auditing purposes and delete the resource. The process (or a different process) may then send a notification with the details back to the user. In accomplishing such a workflow, may different systems and/or processes may be used.

Figure 4:
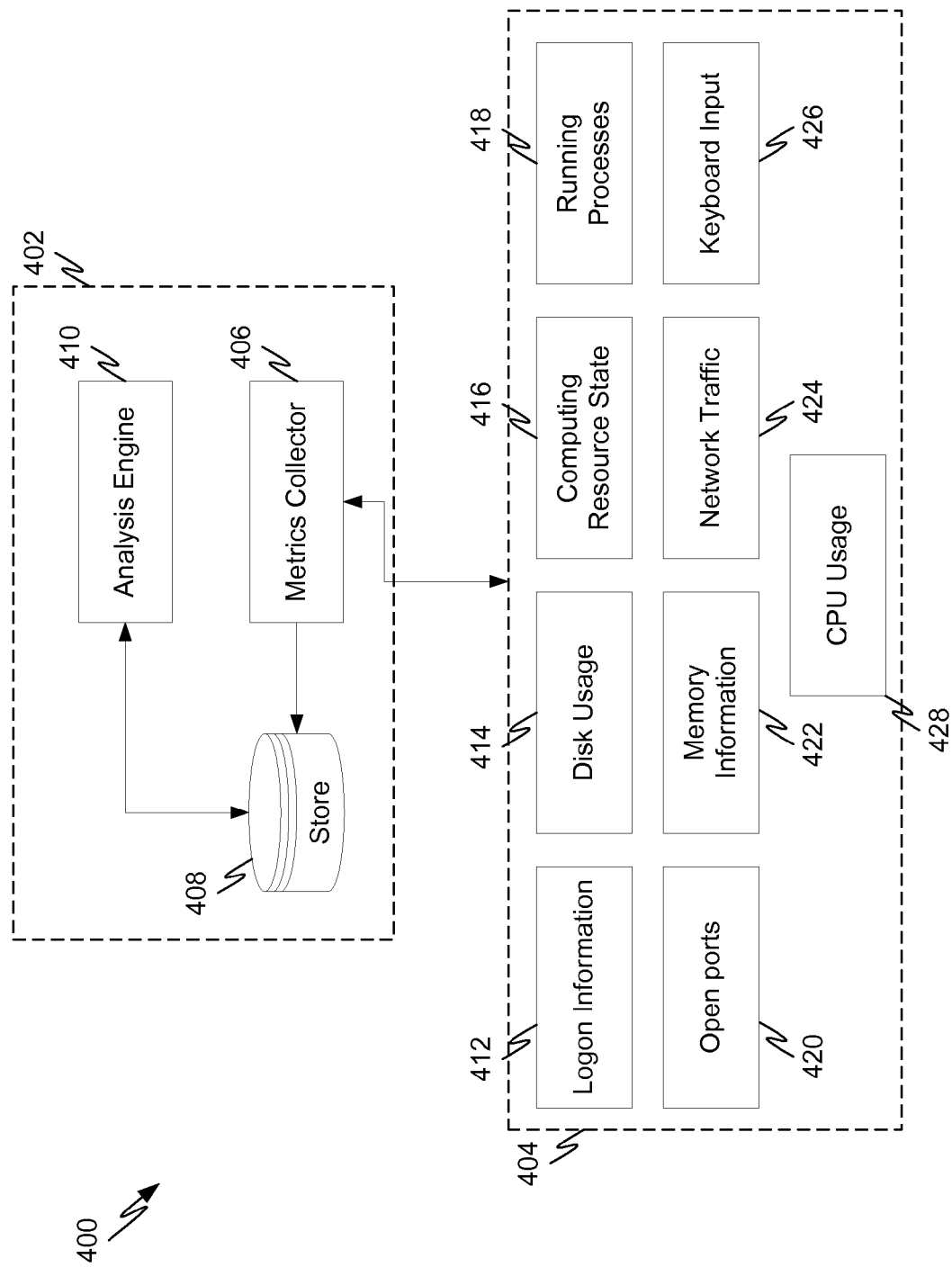
FIG. 4 illustrates an example of various metrics that relate to utilization of a computing resource.

FIG. 4 illustrates an example of various metrics that relate to utilization of a resource. The system, shown generally as 400, may comprise a monitoring and adjustment system 402 as well as various metrics 404 relating to virtual machine utilization. How data related to various metrics 404 are collected is discussed below.

Monitoring and adjustment system 402 represents an example of how metrics may be collected and analyzed and decisions made as to what should happen to provisioned virtual machines. Monitoring and adjustment system 402 may comprise a mechanism to identify and collect metrics 404 that relate to resource utilization. As discussed below, data representing metrics 404 may be collected from the resource, from a physical system, from a cloud system, resource, from an environment related to any of these such as a host operating system, network, etc. and/or from some combination thereof. In FIG. 4, metrics collector 406 represents the mechanism that identifies and collects metrics related to resource utilization.

Metrics collector 406 may collect data (or data values) for the various metrics so that trends may be monitored over time. This may be important when attempting to identify resources that are no longer needed as not all resources are used on a continual basis. Thus, the various metrics may indicate patterns over time that will indicate either continued use or that the resource is likely unused. Also, as used herein, "data" and/or "data values" may include the absence of a value or metric. For example, if a user does not log onto a system (e.g., the absence of a entry indicating a user logged onto the system), a data value associated with that even may be either expressly stored (e.g., "no logon") or may be inferred from the absence of an entry indicating a logon event. Both are encompassed within the terms "data," "data value," "collected data," or "collected data value" as used herein.

As data is collected, it may be stored for later analysis. Data store 408 represents such a storage location. Note that data store 408 may be local or remote, permanent or temporary. Similarly, data stored on data store 408 may be kept until no longer needed and then either archived or deleted. All that is required is to match the characteristics of data store 408 and the data stored thereon to the desire analysis schedule. In determining how long to keep data, consideration should be given as to how much (or how long) data is needed to determine usage or non-usage from a given metric in addition to other purposes, such as auditing, error checking, etc. In other words, the system will generally keep sufficient data to identify the desired patterns in the metrics. Also the system need not keep all gathered data for the same amount of time. For example, one metric that may display patterns of usage (or non-usage) in a shorter period of time may be kept for less time than another metric that may display patters of usage (or non-usage) in a longer period of time.

Analysis engine 410 retrieves data stored on data store 408 and analyzes it to determine whether a resource is utilized or not utilized. In performing this analysis, analysis engine 410 may make a decision (e.g., use or non-use) and/or associate that decision with a confidence level (sometimes referred to as a confidence factor). The confidence level may be interpreted as how likely it is that a given determination is correct (e.g., the resource is utilized or not utilized).

The analysis performed by analysis engine 410 is discussed in greater detail below. However, in general, the metrics may be examined individually or collectively for patterns that indicate use or non-use of a resource. In making this examination, the analysis engine 410 may use decision criteria to indicate what metric value or combination of metric values yields a particular decision, perhaps with an associated confidence level. These decision criteria may also indicate patterns that should be used to identify a decision and/or confidence level. Criteria may be based on combined metrics and/or individual metrics.

Monitoring and adjustment system 402 may also comprise other engines, modules, systems and/or services (not shown). For example, monitoring and adjustment system 402 may comprise an orchestration engine, such as that illustrated in conjunction with FIG. 1, FIG. 2 and/or FIG. 3. As another example, monitoring and adjustment system 402 may also comprise a policy engine or policy store, such as the policy engines illustrated in conjunction with FIG. 1 and/or FIG. 3.

Turning to metrics 404, the following discusses the various metrics and indicates what the metric measures. Discussion about how data from such metrics may be collected is discussed in greater detail below. Monitoring and adjustment system 402 may take advantage of a wide variety of metrics to make a determination as to whether a particular resource is used or not used. Some metrics relate to only a particular resource and, thus, data regarding such metrics are gathered on a per resource basis. Some metrics may relate to more than one resource and, thus, data regarding these metrics may be gathered and applied to a variety of resources. Thus, data gathered that relates to a particular user may relate across all the user's resources.

Data gathered from a particular environment or physical machine may relate to resources on that physical machine. Data gathered from a particular cloud environment may relate to resources across the cloud or only to particular resources of that cloud. As data is collected and stored, it can be tagged or otherwise stored in a manner that allows retrieval by the desired dimension, such as by resource, user, or other relevant dimension. Also, the data can be time stamped so that various data streams can be time-aligned for analysis if needed/desired.

Logon information 412 represents user logon information for a resource, such as an account, a virtual and/or physical machine. Logon information can be collected by resource, by user/user account, or by any other relevant dimension. In general, logon information by itself may not be sufficient to tell whether a particular resource is being used. For example, if a user connects to the resource remotely, such as by executing a remote job, there may not be any logon information. In another example, if a resource such as a virtual machine is used as a file server, then there may also not be any logon information. However, in these situations, some resources keep track of connection information (e.g., when remote connections are made to the resource). Such connection information may be collected, either as part of the logon information or as a separate metric. Also, as discussed elsewhere, the absence of logon information can either be collected as a particular data point (e.g., "no logon" or "no connection") or may be inferred by the absence of a "logon" or "connection" data point.

Disk usage 414 may be collected in a couple of dimensions and at a couple of different levels. In one aspect, the actual storage space may be collected. This may be for a particular resource or the disk space allocated and/or used by a particular resource. In addition, it may be possible to separate out the storage space allocated and/or used to operation of the resource itself from the storage space allocated and/or used for "user data" that is created and/or utilized by a user of the resource. Unless configuration of the resource changes, the storage space allocated to the operation of the resource is not likely to change over time, independent of whether a resource is used. However, the space utilized by users will often change, either increasing or decreasing, as a user uses a resource.

In another aspect, disk activity may be collected. By monitoring how often files are used and accessed, use of a resource may be inferred. Some systems time stamp files when events happen to the file such as when a file is accessed, created, modified, etc. Collecting and tracking such time stamps can be helpful in ascertaining utilization of a particular resource. Note that exactly what is tracked varies from system to system based on the resource characteristics such as operating system, virtual machine environment, underlying physical machine operating system (e.g., host operating system), etc. This means that various resources may have different data that is available and/or accessible for collection.

Computing resource state 416 refers to the state of a particular computing environment or particular processes within the computing environment, such as shutdown, hibernate, active, etc. Again, the particular computing state varies somewhat from operating system to operating system, computing environment to computing environment. Thus, what is available and/or accessible for collection can vary depending on the particular embodiment. However, computing resource state 416 may include the state of the resource such as a virtual machine itself, the state of the various processes that make up the resource, the state of processes within the host environment, and so forth. These can be collected over time in order to evaluate what is happing both to the resource and "within" the resource.

Computing resource state 416 may have a lot of variation in the data. In other words, the state of various processes can change relatively quickly, particularly when the number of processes is large. Thus, it is possible to collect a lot of data in a short period of time. Steps may be taken to reduce the number of data points collected either by selecting only certain aspects of the environment or certain processes to monitor or by processing the data to "summarize" what happens over a period of time or some combination thereof. In any particular embodiment, some aspects of the environment may be more likely to be informative as to whether a particular resource is being used or not. Thus, if certain processes vital to the functioning of a virtual machine spend a lot of time hibernated or swapped out of memory, that may be more indicative of non-use than an idle disk. The system may, therefore, concentrate more on the more indicative aspects than on other aspects in some embodiments.

In other embodiments, data can be reduce through "summarization" or "compression" in the sense that not every data point needs to be collected. It may be sufficient to note the least common aspect and infer the more common aspect. For example, if a particular process or computing environment aspect spends more time idle than active, it may be possible to only capture the active portion and infer the idle portion. In other situations, other alternatives may be chosen or selected.

Finally, "noisy" data can be filtered somewhat in certain embodiments without losing information (or too much important information) so some embodiments may tradeoff between data capture and information capture. If twice the amount of data only gives a fraction more information, some embodiments may be configured to forego the additional information for a large savings on storage space.

Running processes 418 is similar in some ways to computing resource state 416. However the focus is on the processes that are active in the system, such as the virtual machine, host operating system, host machine, etc. Running processes 418 may be as simple as a list of executing processes or may be more complete, such as resources allocated to the process, CPU time spent running, I/O accesses, memory allocated, etc. Any or all of these may be collected in any combination. Again various strategies, such as those discussed above, may be used if the data collected is too large or is too "noisy."

Open ports 420 identifies open ports on a resource such as a virtual machine or a host machine that are opened in conjunction with a particular virtual machine. Open ports includes any type of port information for any relevant communication protocol. Open ports are often associated with system operation and process execution. If the open ports change over time, there is a greater likelihood that a resource is being used.

Memory information 422 comprises information about memory usage by a resource such as a virtual machine and/or processes executing in the virtual machine. In that sense, this metric is similar to computing resource state 416 and running processes 418. Memory information 422 may include memory space, like the memory allocated or utilized by the resource or processes, and/or memory activity, like paging, etc., and/or a memory signature. A memory signature may be created using a function that varies as the input changes. Computing a hash value is a typical way of creating a memory signature. As the signature is only designed to detect changes in memory, there are no special requirements for the hash function to be used. The only requirement is that the hash function is able to detect memory changes with a low probability of collision (e.g., two different input values mapping to the same hash value) for the input length. In this situation, low probability means that it is more likely than not that a hash value will properly detect memory changes over the time period of interest (e.g., the time period that analysis engine 410 is performing its analysis using memory information 422).

Network traffic 424 comprises information about network usage by the resource and/or processes executing in the resource. Network traffic 424 may include network activity, such as information sent/received, as well as resources devoted to network activity. Network traffic 424 includes input/output by any network and can either be aggregated, or segregated by network.

Keyboard input 426 represents input by a user to the resource, a process on the resource, and/or the resource environment. Although 426 is listed specifically as keyboard input, other input may be included in this metric, if desired, or may be broken out separately. Keyboard input 426 may include a "is there keyboard input or not" indication, or may actually capture the keyboard input for further analysis.

CPU usage 428 represents the CPU and/or other processor utilization by a process on the resource, a process of the resource itself, or other process that can indicate utilization of the resource. In this sense, it is similar to, and perhaps related to, computing resource state 416 and running processes 418. Basically, the CPU time taken by the resource can be an indication of how often (and whether) the resource is used.

Figure 5:
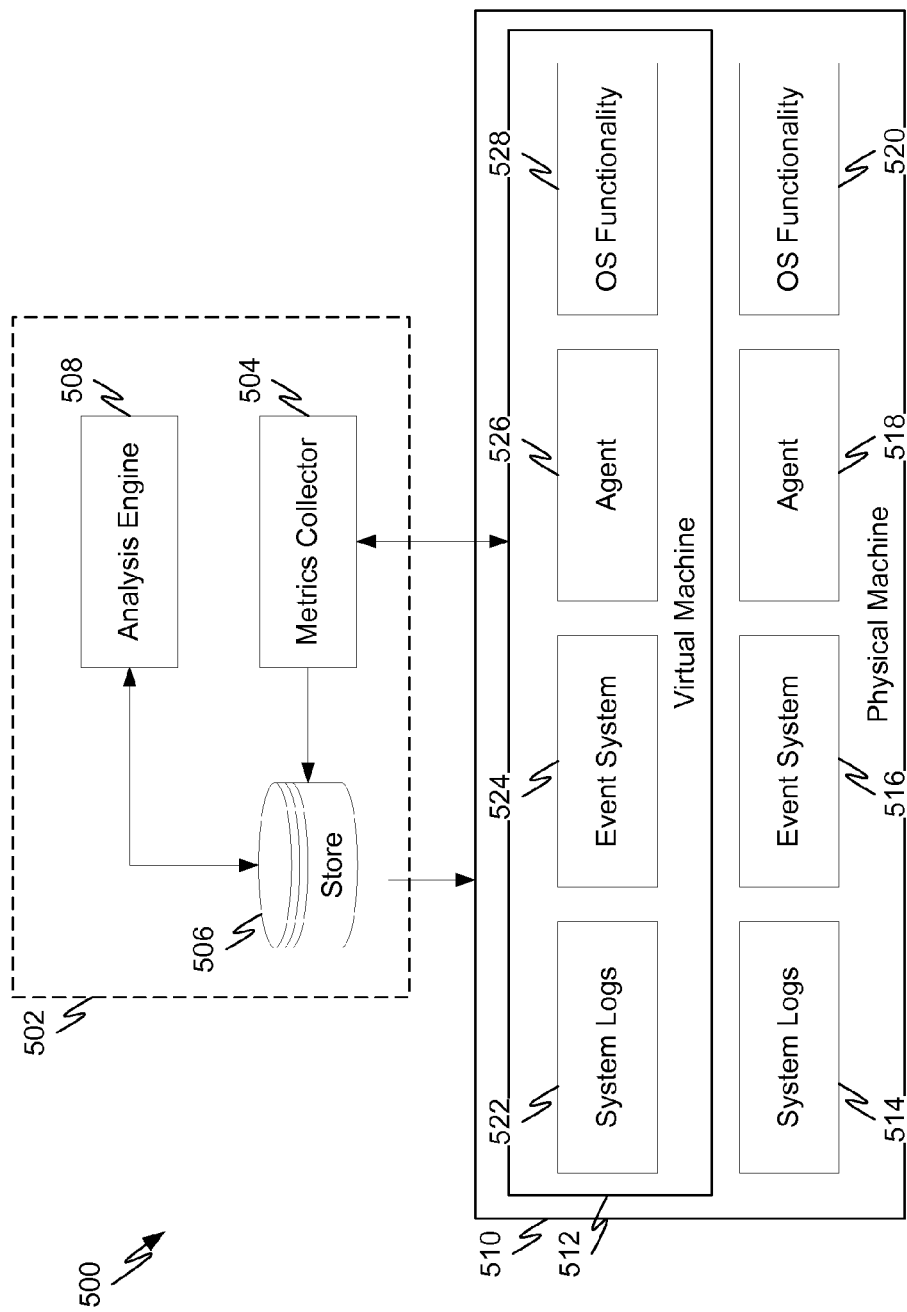
FIG. 5 illustrates an example system to collect metrics relating to utilization of a virtual machine.

FIG. 5 illustrates an example system 500 to collect metrics relating to utilization of a virtual and/or physical machine. The embodiment in FIG. 5 comprises monitoring and adjustment system 502. Monitoring and adjustment system 502 represents an example of how metrics may be collected and analyzed and decisions made as to what should happen to provisioned virtual machines. Monitoring and adjustment system 502 may comprise a mechanism to identify and collect metrics (not shown) that relate to virtual machine utilization. As discussed below, data representing metrics may be collected from the virtual machine, from a physical system, or from an environment related to either (or both) such as a host operating system, network, etc. and/or from some combination thereof. In FIG. 5, metrics collector 504 represents the mechanism that identifies and collects metrics related to virtual machine utilization.

Metrics collector 504 may collect data (or data values) for the various metrics so that trends may be monitored over time. This may be important when attempting to identify virtual machines that are no longer needed as not all virtual machines are used on a continual basis. Thus, the various metrics may indicate patterns over time that will indicate either continued use or that the virtual machine is likely unused. Also, as used herein, "data" and/or "data values" may include the absence of a value or metric. For example, if a user does not log onto a system (e.g., the absence of an entry indicating a user logged onto the system), a data value associated with that even may be either expressly stored (e.g., "no logon") or may be inferred from the absence of an entry indicating a logon event. Both are encompassed within the terms "data," "data value," "collected data," or "collected data value" as used herein.

As data is collected, it may be stored for later analysis. Data store 506 represents such a storage location. Note that data store 506 may be local or remote, permanent or temporary. Similarly, data stored on data store 506 may be kept until no longer needed and then either archived or deleted. All that is required is to match the characteristics of data store 506 and the data stored thereon to the desire analysis schedule. In determining how long to keep data, consideration should be given as to how much (or how long) data is needed to determine usage or non-usage from a given metric. In other words, the system will generally keep sufficient data to identify the desired patterns in the metrics. Also the system need not keep all gathered data for the same amount of time. For example, one metric that may display patterns of usage (or non-usage) in a shorter period of time may be kept for less time than another metric that may display patters of usage (or non-usage) in a longer period of time.

Analysis engine 508 retrieves data stored on data store 506 and analyzes it to determine whether a virtual machine is utilized or not utilized. In performing this analysis, analysis engine may make a decision (e.g., use or non-use) and/or associate that decision with a confidence level (sometimes referred to as a confidence factor). The confidence level may be interpreted as how likely it is that a given determination is correct (e.g., the virtual machine is utilized or not utilized).

The analysis performed by analysis engine 508 is discussed in greater detail below. However, in general, the metrics may be examined individually or collectively for patterns that indicate use or non-use of a virtual machine. In making this examination, the analysis engine 508 may use decision criteria to indicate what metric value or combination of metric values yields a particular decision, perhaps with an associated confidence level. These decision criteria may also indicate patterns that should be used to identify a decision and/or confidence level. Criteria may be based on combined metrics and/or individual metrics.

Monitoring and adjustment system 502 may also comprise other engines, modules, systems and/or services (not shown). For example, monitoring and adjustment system 502 may comprise an orchestration engine, such as that illustrated in conjunction with FIG. 1, FIG. 2 and/or FIG. 3. As another example, monitoring and adjustment system 502 may also comprise a policy engine or policy store, such as the policy engines illustrated in conjunction with FIG. 1 and/or FIG. 3.

Metrics collector 504 may utilize a variety of mechanisms to gather metrics data for later analysis. Metrics can include any number of items that indicate utilization or non-utilization of a virtual machine. In general, the mechanisms metrics collector 504 may use to metrics data may be categorized into various classes, such as system logs, event systems, agents, and/or operating system functionality. In addition, some characteristics of physical machines, such as firmware or other hardware/hardware-assisted functionality may be used. Note that these categorizations not necessarily mutually exclusive. For example, collecting information from system logs may be part of the operating system functionality in some embodiments.

FIG. 5 illustrates physical machine 510, which represents the host machine for a particular virtual machine along with all the support functionality and services that are needed to host the virtual machine. Much of this support functionality and services is not specifically illustrated in physical machine 510 in order to focus on the aspects being described. However, as part of the aspects described herein, this functionality and these services may play a role.

Physical machine 510 may comprise system logs 514. System logs 514 represent any logs kept by physical machine 510. System logs 514 may represent one way in which metrics collector 504 may gather data on particular desired metrics. Although there is wide variation between computing environments and various embodiments, system logs may include a record of items or events that happen on a system. For example, connections to a machine are often logged. Other items that may be stored in logs are errors, access attempts, usage statistics, logon events, process or service startup and shutdown, diagnostic information, etc. System logs 514 may be a rich source of metric data that may be collected by metrics collector 504. Access to system logs may be direct (e.g., metric collector 504 reads the logs directly) or may be through a service or functionality provided by the operating system.

Physical machine 510 may also comprise event system 516. Event system 516 represents a system that captures events occurring on physical and/or virtual machine 510 and either logs them or uses the to initiate further action, such as notify a system administrator. As such, event system 516 and the other elements, such as system logs 514, may be closely related or even utilize each other for various purposes. In some embodiments metrics collector 504 may use event system 516 to capture metric data. Events may be logged and so may include items such as those discussed in conjunction with system logs 514 above.

Metrics collector 504 may also use agents to collect data from physical machine 510. Agent 518 illustrates such agents. Agents may be services, daemons, or other software that runs on a system and gathers information for metrics collector 504. Agents allow specific information on physical system 510 to be monitored and collected.

Metrics collector 504 may also collect metric data directly from physical machine 510 using operating system functionality. This aspect is illustrated by operating system functionality 520. Operating system functionality 520 represents any mechanism provided by the physical machine 510 operating system that provides access to desired metric data. Examples may include functionality that can return information regarding disk usage, memory usage, or any other metric.

Although system logs 514, event system 516, agent 518 and operating system functionality 520 have been discussed in conjunction with physical machine 510, these items may also be associated with entities like the virtual machine operating environment, like a virtual machine monitor (not shown).

FIG. 5 also illustrates virtual machine 512 as comprising system logs 522, event system 524, agent 526 and operating system functionality 528. These operate like the previously described system logs 514, event system 516, agent 518 and operating system functionality 520, respectively, except that they exist within the virtual machine rather than the physical machine. The metric data collected thereby will relate to virtual machine 512 and processes executing thereon instead of physical machine 510.

Figure 6:
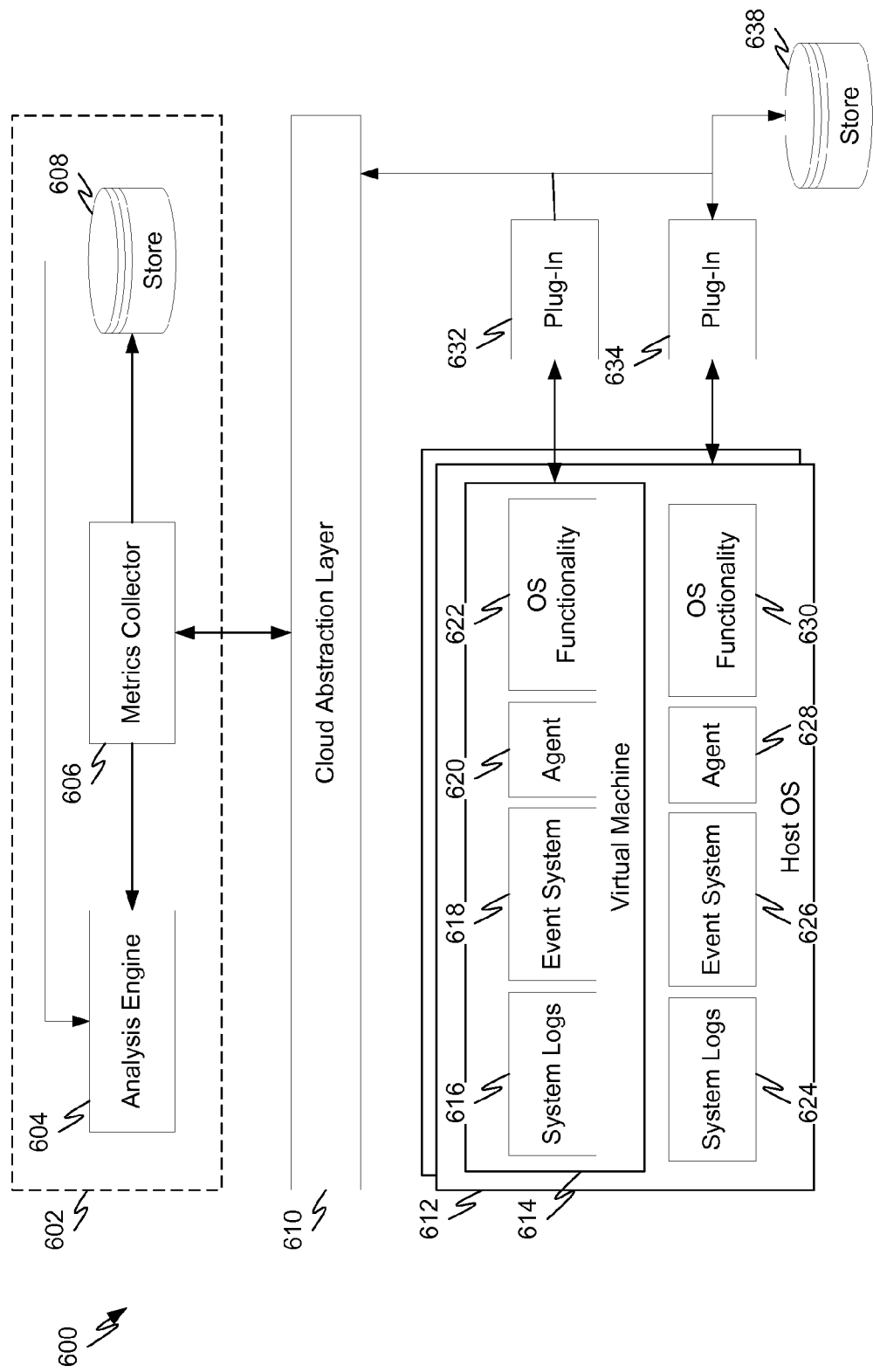
FIG. 6 illustrates an example system to collect metrics relating to utilization of cloud computing resources.

FIG. 6 illustrates an example system to collect metrics relating to utilization of cloud computing resources. The embodiment in FIG. 6 comprises monitoring and adjustment system 602. Monitoring and adjustment system 602 represents an example of how metrics may be collected and analyzed and decisions made as to what should happen to provisioned cloud resources. Monitoring and adjustment system 602 may comprise a mechanism to identify and collect metrics (not shown) that relate to resource utilization. As discussed below, data representing metrics may be collected from the cloud resource itself (e.g., virtual machine(s), content distribution system(s), storage system(s), application server(s), web hosting system(s), etc.) from a physical system (s), or from an environment related to either (or both) such as a host operating system, network, etc. and/or from some combination thereof. In FIG. 6, metrics collector 606 represents the mechanism that identifies and collects metrics related to virtual machine utilization.

Metrics collector 606 may collect data (or data values) for the various metrics so that trends may be monitored over time. This may be important when attempting to identify virtual machines that are no longer needed as not all virtual machines are used on a continual basis. Thus, the various metrics may indicate patterns over time that will indicate either continued use or that the virtual machine is likely unused. Also, as used herein, "data" and/or "data values" may include the absence of a value or metric. For example, if a user does not log onto a system (e.g., the absence of a entry indicating a user logged onto the system), a data value associated with that even may be either expressly stored (e.g., "no logon") or may be inferred from the absence of an entry indicating a logon event. Both are encompassed within the terms "data," "data value," "collected data," or "collected data value" as used herein.

As data is collected, it may be stored for later analysis. Data store 608 represents such a storage location. Note that data store 608 may be local or remote, permanent or temporary. Similarly, data stored on data store 608 may be kept until no longer needed and then either archived or deleted. All that is required is to match the characteristics of data store 608 and the data stored thereon to the desire analysis schedule. In determining how long to keep data, consideration should be given as to how much (or how long) data is needed to determine usage or non-usage from a given metric. In other words, the system will generally keep sufficient data to identify the desired patterns in the metrics. Also the system need not keep all gathered data for the same amount of time. For example, one metric that may display patterns of usage (or non-usage) in a shorter period of time may be kept for less time than another metric that may display patters of usage (or non-usage) in a longer period of time.

Analysis engine 604 retrieves data stored on data store 608 and analyzes it to determine whether a resource is utilized or not utilized. In performing this analysis, analysis engine 604 may make a decision (e.g., use or non-use) and/or associate that decision with a confidence level (sometimes referred to as a confidence factor). The confidence level may be interpreted as how likely it is that a given determination is correct (e.g., the resource is utilized or not utilized).

The analysis performed by analysis engine 604 is discussed in greater detail below. However, in general, the metrics may be examined individually or collectively for patterns that indicate use or non-use of a resource. In making this examination, the analysis engine 604 may use decision criteria to indicate what metric value or combination of metric values yields a particular decision, perhaps with an associated confidence level. These decision criteria may also indicate patterns that should be used to identify a decision and/or confidence level. Criteria may be based on combined metrics and/or individual metrics.

Monitoring and adjustment system 602 may also comprise other engines, modules, systems and/or services (not shown). For example, monitoring and adjustment system 602 may comprise an orchestration engine, such as that illustrated in conjunction with FIG. 1, FIG. 2 and/or FIG. 3. As another example, monitoring and adjustment system 602 may also comprise a policy engine or policy store, such as the policy engines illustrated in conjunction with FIG. 1 and/or FIG. 3.

Metrics collector 606 may utilize a variety of mechanisms to gather metrics data for later analysis. Metrics can include any number of items that indicate utilization or non-utilization of a virtual machine. In general, the mechanisms metrics collector 606 may use to metrics data may be categorized into various classes, such as system logs, event systems, agents, and/or operating system functionality. In addition, some characteristics of physical machines, such as firmware or other hardware/hardware-assisted functionality may be used. Note that these categorizations not necessarily mutually exclusive. For example, collecting information from system logs may be part of the operating system functionality in some embodiments.

FIG. 6 illustrates host operating system(s) 612 and virtual machine(s) 614 as examples of cloud resources. As discussed elsewhere, other cloud resources such as storage system(s), content distribution system(s), application server(s), web hosting system(s), etc. may also be part of cloud resources, and the principles discussed herein apply equally to these other cloud resources.

Host operating system 612 may comprise system logs 624. System logs 624 represent any logs kept by host operating system 612. System logs 624 may represent one way in which metrics collector 606 may gather data on particular desired metrics. Although there is wide variation between computing environments and various embodiments, system logs may include a record of items or events that happen on a system. For example, connections to a machine are often logged. Other items that may be stored in logs are errors, access attempts, usage statistics, logon events, process or service startup and shutdown, diagnostic information, etc. System logs 624 may be a rich source of metric data that may be collected by metrics collector 606.

Host operating system 612 may also comprise event system 626. Event system 626 represents a system that captures events occurring on Host operating system 612 and either logs them or uses the to initiate further action, such as notify a system administrator. As such, event system 626 and the other elements, such as system logs 624, may be closely related or even utilize each other for various purposes. In some embodiments metrics collector 606 may use event system 626 to capture metric data. Events may be logged and so may include items such as those discussed in conjunction with system logs 624 above.

Metrics collector 606 may also use agents or other software entities to collect data from Host operating system 612. Agent 628 illustrates such agents. Agents may be services, daemons, or other software that runs on a system and gathers information for metrics collector 606. Agents allow specific information on Host operating system 612 to be monitored and collected.

Metrics collector 606 may also collect metric data directly from Host operating system 612 using operating system functionality. This aspect is illustrated by operating system functionality 630. Operating system functionality 630 represents any mechanism provided by Host operating system 612 that provides access to desired metric data. Examples may include functionality that can return information regarding disk usage, memory usage, or any other metric.

Although system logs 624, event system 626, agent 628 and operating system functionality 630 have been discussed in conjunction with Host operating system 612, these items may also be associated with entities like the virtual machine operating environment, like a virtual machine monitor (not shown).

FIG. 6 also illustrates virtual machine 614 as comprising system logs 616, event system 618, agent 620 and operating system functionality 622. These operate like the previously described system logs 624, event system 626, agent 628 and operating system functionality 630, respectively, except that they exist within the virtual machine rather than the physical machine. The metric data collected thereby will relate to virtual machine 614 and processes executing thereon instead of host operating system 612.

Since host operating system 612 and virtual machine 614 represent only a small illustration of the variety of resources that may exist in a cloud, the principles here may be expanded to deal with multiple such resources. Cloud systems typically have numerous physical machines, various host operating systems, numerous virtual machines and/or guest operating systems, storage devices, executing processes, etc. Gathering metrics across a vast array of systems may take numerous forms. In some example embodiments, metrics from individual resources may be collected and/or aggregated locally. Then the collected and/or aggregated metrics may be pushed to a higher level, further collected and/or aggregated, and so on until metrics for the entire set of resources are collected and/or aggregated. Then the entire collected and/or aggregated metrics can be pushed to the metrics collector on a periodic basis. Alternatively, metrics can be collected without rolling to various levels and/or without aggregation at various levels. Alternatively a pull/poll model can be used either locally, or on some other level. Alternatively, some combination of push and pull/poll may be used (e.g., where metrics are pushed to some location and/or level and then pulled from there or vice versa).

Other alternatives may use agents on virtual machines and/or guest operating systems and/or other resources. Other alternatives only have agents on host operating systems, which collect information from virtual machines and/or guest operating systems and/or other resources. Agents can be software, firmware or some combination thereof.

As indicated by store 638 metrics may be persisted within the cloud until they are transferred to metrics collector 606. Such, however, is not required and may be optional. Similarly, only some metrics may be persisted or metrics may be persisted only upon certain conditions (such as loss of communication with metrics collector 606, data collection exceeding communication bandwidth, etc.). Although FIG. 6 illustrates store 638 connected to cloud resources through plug-ins 632 and/or 634, store 638 may be directly connected to cloud resources. Similarly, store 638 may be local or remote, centralized or distributed, or any combination thereof, depending on the particular embodiment.

As indicated in FIG. 6, interaction between metrics collector 606 and cloud resources occurs through cloud abstraction layer 610. Cloud abstraction layer 610 provides an interface to interact with any cloud and may also provide an interface that allows multiple clouds to appear as a single cloud. Also as shown in FIG. 6, plug-ins may be used to communicate with cloud systems and/or resources within cloud systems. Plug-in 632 and plug-in 634 represent examples of such plug-ins. Although not required, embodiments using plug-ins may easily add support for additional types of clouds/cloud resources by adding a plug-in that encapsulates the functionality needed to adapt the new cloud and/or cloud resource to the cloud abstraction layer 610.

Figure 7:
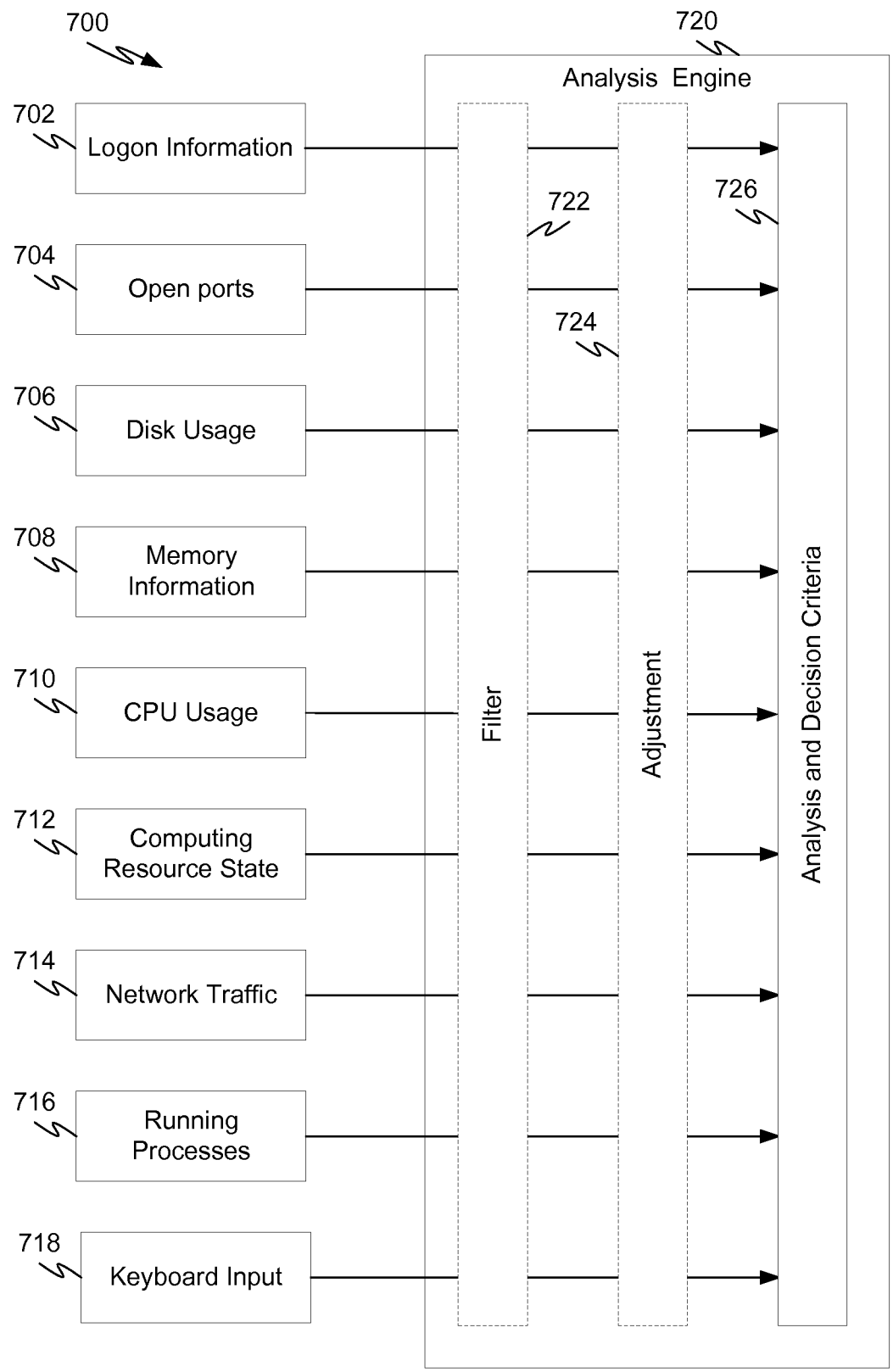
FIG. 7 illustrates an example system to analyze metrics and determine if a computing resource is being utilized.

FIG. 7 illustrates an example embodiment 700 to analyze metrics and determine if a virtual machine is being utilized. FIG. 7 illustrates a variety of metric data which may be analyzed by analysis engine 720 in order to determine whether a virtual machine is being used or not. The metric data illustrated in FIG. 7 comprises logon information 702, open ports 704, disk usage 706, memory information 708, CPU usage 710, computing resource state 712, network traffic 714, running processes 716, and keyboard input 718. This list contains data from the same metrics shown in FIG. 4. The description of the metric list in FIG. 7 is, therefore, the same as that shown in FIG. 4 and need not be repeated here. Additionally, or alternatively, data from either more or fewer metrics may be utilized. The list shown in FIG. 7 is by way of example, and not limitation.

Analysis engine 720 retrieves metric data, such as that illustrated in FIG. 7, and analyzes it to determine whether a virtual machine is utilized or not utilized. In performing this analysis, analysis engine may make a decision (e.g., use or non-use) and/or associate that decision with a confidence level (sometimes referred to as a confidence factor). The confidence level may be interpreted as how likely it is that a given determination is correct (e.g., the virtual machine is utilized or not utilized).

Prior to, or in conjunction with, the analysis, the data may be modified and/or changed in some way to facilitate the analysis. A wide variety of mechanisms may be applied, such as those common to various signal processing systems. In conjunction with this disclosure, not all of these options are discussed in detail. However, sufficient detail will be provided to allow one of ordinary skill in the art to apply the principles disclosed herein.

Before the data is analyzed, data from various metrics may be filtered, as illustrated by filter 722. Filter 722 represents any type of filtering that should be performed to facilitate analysis. Such filtering may include, for example, various filters that smooth "noise" from the data in order to more clearly evaluate the "signal" that is inherent in the data. As an example, memory paging data for an executing process may change very rapidly and hence may be considered "noisy." From an analysis point of view, however, perhaps all that is necessary is an indication that paging occurred and the time that it occurred. A low pass filter will tend to smooth out the "noise" and will provide an indication of the time period over which paging occurred.

Another example of filtering in the general sense is quantization (e.g., thresholding) or other data transformation. In quantization, a value is compared to a threshold and if it exceeds the threshold, the value is replaced by one value and if it falls below the threshold, the value is replaced with a different value. Quantization can have various quantization levels, depending on the particular metric and the data involved. In general, filter 722 may operate either on the values (e.g., amplitude) of the various metric data or on the time axis of the data (e.g., shifting in time) or some combination of both.

In addition to, or instead of, filter 722, other changes may be made to the data. Adjustment 724 illustrates these changes. Such changes may include changes desired to make the data easier to process. As an example, if metric data is inferred from the collected data, adjustment 724 may "fill out" the inferred data in the data set so various analysis techniques may be employed. As yet another example, obviously bad data points may be eliminated in the data set. As still another example, one collection of metric data may be time aligned to another collection of metric data in order to make analysis easier, although this last may also fall under the filtering step.

Filter 722 and adjustment 724 may be applied in any combination to prepare the data for analysis. This means that in some instances some metric data may be filtered, some adjusted, some both filtered and adjusted, and some neither filtered nor adjusted.

Filter 722 and adjustment 724 are illustrated as part of analysis engine 720. Alternatively, or additionally, filtering and/or adjustment may be performed at other locations and/or by other entities. In yet other embodiments, no filtering and/or or adjustment may be made.

Analysis and decision criteria block 726 represents the analysis and decision making process. As previously discussed, the metric data may be examined individually or collectively for patterns that indicate use or non-use of a virtual machine. In general analysis and decision are two steps, although the distinction can be lost in some embodiments. The analysis process examines the data in a particular way using a particular process to produce a result. The decision process maps that result to a decision.

There are many mechanism for analysis that may be employed. In some embodiments, a metric or group of metrics are compared to a threshold to produce a result. For example, logon information is examined to identify whether a user has logged onto the virtual machine in the past month. In addition, the computing resource state is examined to determine the length of time the virtual machine spent shutdown over the past month is also determined.

The decision process typically takes such output(s) (either alone or in combination) and maps them to a decision. Some embodiments also include a confidence factor in the decision. This mapping process typically utilizes decision criteria to determine when something is "used" or "not used" and what the associated confidence factor is, if any.

In one embodiment, a vector of the output of the analysis process may be created and the vector compared to a series of "threshold" vectors that identify patterns of use or non-use of a virtual machine. A least squares approach may then determine the distance between the vectors to arrive at a use or non-use decision. The distance may also determine the confidence factor. In another embodiment, some metrics are used individually, while some are used in combination. For example, if the user has not logged onto the virtual machine over the last month and the virtual machine spent the majority of the month in hibernation, then the virtual machine is not likely in use. Alternatively, if the amount of space used by user data in a virtual machine shows an increasing trend over the month, it is very likely the virtual machine is in use.

Figure 8:
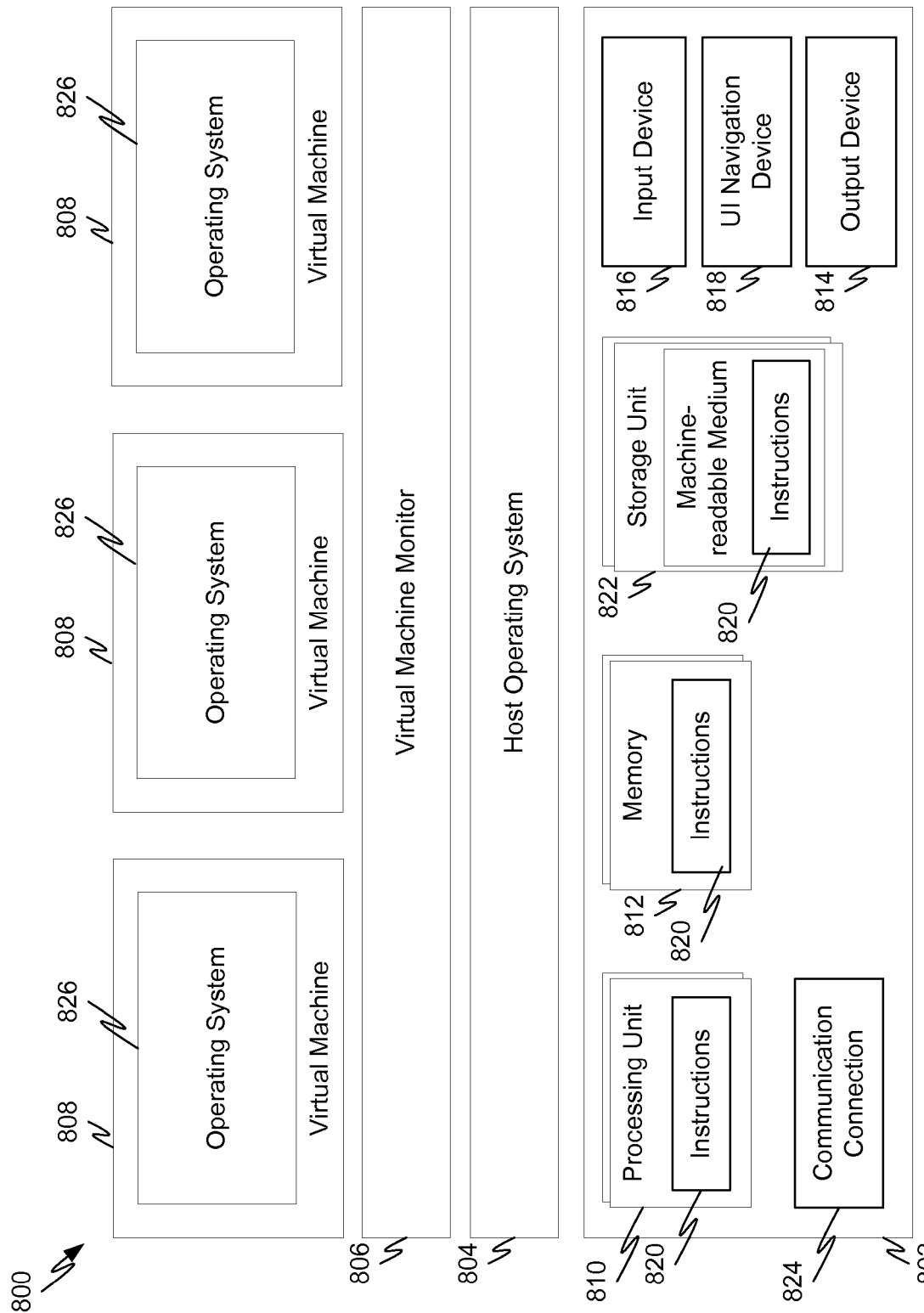
FIG. 8 illustrates an example embodiment of a device suitable for use herein.

FIG. 8 illustrates an example embodiment of a device, shown generally as 800, suitable for use herein. An example embodiment extends to a machine in the example form of a computing device, such as that of FIG. 8, within which instructions for causing the machine to perform any one or more of the methodologies discussed herein may be executed.

In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. In one embodiment, multiple such machines are utilized in a distributed network to implement multiple components in a transaction based environment. An object-oriented, service-oriented, or other architecture may be used to implement such functions and communicate between the multiple systems and components.

The machine may be a personal computer (PC), a tablet device, a Personal Digital Assistant (PDA), a cellular telephone or smartphone, a web appliance, etc. Further, while only a single machine is illustrated, the term "machine" shall also be taken to include any collection of machines that individually or jointly execute a set (or multiple sets) of instructions to perform any one or more of the methodologies discussed herein.

An example machine 800 is illustrated in FIG. 8 and may include a processing unit 802 (e.g., a central processing unit (CPU), a graphics processing unit (GPU), advanced processing unit (APU) or any of the above in any combination), and memory 812 of various forms. The machine may further include a display or other output 814 and an input device 716 such as keyboard, touch screen, various user interfaces such as on screen keyboards, gesture input, voice input, etc. In some embodiments, a separate UI navigation device 718 may also be included.

Machine-Readable Medium

Embodiments also may include machine-readable storage medium on which is stored one or more sets of instructions and data structures (e.g., collectively instructions 720) embodying or used by any one or more of the methodologies or functions described herein. The instructions may also reside, completely or at least partially, within the memory or within the processor during execution thereof by the computer system, with the memory and the processor also constituting machine-readable media.

While the machine-readable storage medium may be shown in an example embodiment to be a single medium, the term "machine-readable storage medium" may include a single storage medium or multiple storage media (e.g., a centralized or distributed database, or associated caches and servers) that store the one or more instructions. The term "machine-readable storage medium" shall also be taken to include any tangible medium that is capable of storing, encoding, or carrying instructions for execution by the machine and that cause the machine to perform any one or more of the methodologies of embodiments of the present application, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. Any of which can be either removable storage or non-removable storage, although some are typically found as one or the other (e.g. removable or non-removable). In FIG. 8, memory 812, storage unit 822, are examples of such machine-readable storage media and may be any of the devices listed above. Machine-readable storage media may also include volatile memory.

Transmission Medium

The instructions may further be transmitted or received over a communications network using a transmission medium via a network interface device (using, for example communication connection 724) and utilizing any one of a number of well-known transfer protocols. Examples of communication networks include a local area network (LAN), a wide area network (WAN), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

FIG. 8 illustrates a representative architecture comprising host operating system 804, virtual machine monitor 806, virtual machines 808, each with an operating system 826, 828, 830. This architecture is simply representative and not all embodiments need all illustrated architectural blocks. The illustrated architectural blocks may be implemented as instructions 820.

Host operating system 804 represents an operating system executed by hardware 802. It provides hosting for the virtual machine environment. Virtual machine monitor 806 represents the control layer for the virtual machine environment. Examples include Hypervisor (HyperV) by Microsoft, Corp., Citrix XenServer, Oracle VM, VMware ESX Server, L4 Microkernals, and many more. Virtual machines 808 are hosted within the virtual machine environment. Each virtual machine has its operating system (826, 828, and 830), which may or may not be the same from virtual machine to virtual machine.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "or" is inclusive unless otherwise explicitly noted. Thus, the phrase "at least one of A, B, or C" is satisfied by any element from the set {A, B, C} or any combination thereof, including multiples of any element.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The embodiments illustrated herein are described in sufficient detail to enable those skilled in the art to practice the teachings disclosed. Other embodiments may be used and derived there from, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method comprising:
    collecting data for a plurality of metrics, each metric relating to utilization of a computing resource allocated to a virtual machine;
    comparing the data to decision criteria;
    determining a confidence level that the virtual machine is not utilized based, at least in part, on the comparing;
    retrieving a policy that defines an action to be taken for the confidence level, wherein the action is derived from a previous action; and
    initiating the action in accordance with the policy and confidence level.

2. The method of claim 1 wherein the plurality of metrics comprises at least one of a virtual machine logon information; open ports on the virtual machine; disk usage; memory information; CPU usage; computing resource state; network traffic; running processes; or keyboard input.

3. The method of claim 2 wherein disk usage comprises disk activity by the virtual machine.

4. A system comprising:
    a processor; and
    a storage device to store instructions, that when executed by the processor cause the system to:
        retrieve data representing utilization of a computing resource allocated to a virtual machine;
        compare the data to a decision criteria and a policy that relates results of the compare to an action;
        determine a confidence level that the virtual machine is not utilized based, at least in part, on the compare;
        select the action based, at least in part, on the confidence level, wherein the action is derived from a previous action; and
        initiate the action.

5. The system of claim 4 wherein the action comprises a notification sent to a user of a virtual machine.

6. The system of claim 5 wherein the notification reports a determination of utilization of a virtual machine.

7. The system of claim 6 wherein the notification includes a notice of future action to be taken by the system when certain conditions are met.

8. The system of claim 4 wherein the action comprises modifying allocated resources.

9. A computer product comprising:
    a computer readable storage medium having computer readable program code embodied therewith, the computer readable program code configured to:
        retrieve data representing a plurality of metrics related to utilization of a virtual machine, wherein a computing resource is allocated to the virtual machine;
        analyze the data relative to a decision criteria to determine a confidence level related to utilization of the virtual machine;
        select an action based, at least in part, on a policy that defines action to be initiated, wherein the action is derived from a previous action; and
        initiate the action.

10. The computer product of claim 9 wherein the decision criteria contains a threshold for one of the plurality of metrics and the analysis compares the one of the plurality of metrics to the threshold and determines the confidence level based, at least in part, on that comparison.

11. The computer product of claim 9 wherein the previous action is a notification and wherein the action comprises deleting the virtual machine.

12. The computer product of claim 11 wherein the action comprises archiving user data associated with the virtual machine prior to deleting the virtual machine.

13. The method of claim 1, wherein a severity of the action is greater as the confidence level increases.

14. The method of claim 1, wherein the action is more severe than the previous action.

15. The method of claim 1, wherein the action is less severe than deallocation of the computing resource from the virtual machine.

16. The system of claim 4, wherein a severity of the action increases as the confidence level increases.

17. The system of claim 16, wherein the action is less severe than deallocation of the computing resource from the virtual machine.

18. The computer product of claim 9, wherein the action is more severe than the previous action.

19. The computer product of claim 18, wherein the action is less severe than deallocation of the computing resource from the virtual machine.

* * * * *